March 25, 1930.　　　V. LINK　　　1,751,743
ENGINE
Filed Dec. 4, 1926
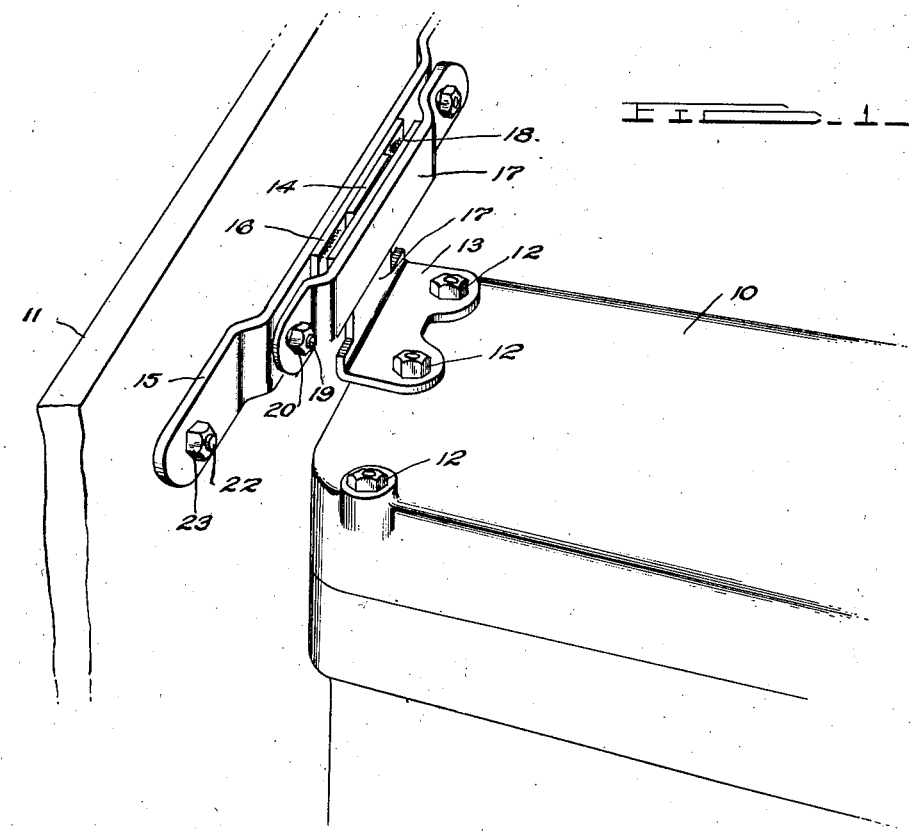
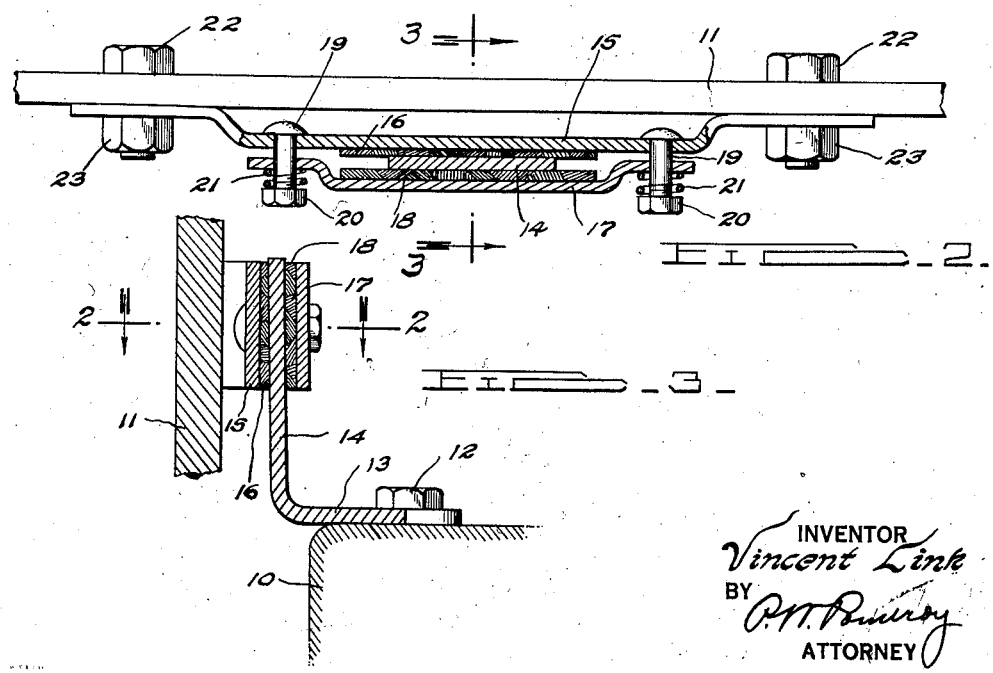
INVENTOR
Vincent Link
BY
ATTORNEY Patented Mar. 25, 1930

1,751,743

UNITED STATES PATENT OFFICE

VINCENT LINK, OF DETROIT, MICHIGAN, ASSIGNOR TO THE STUDEBAKER CORPORATION, OF SOUTH BEND, INDIANA, A CORPORATION OF NEW JERSEY

ENGINE

Application filed December 4, 1926. Serial No. 152,689.

This invention relates to motor vehicles and particularly to means for preventing torque reactions of the motor or engine from being apparent to the occupant of the vehicle of which it forms a part.

The principal object is to provide means for frictionally damping excessive movement of the engine of a motor vehicle caused by the torque reactions in the engine.

Another object is to provide a frictional connection between the engine of a motor vehicle and a part stationary with respect to the frame thereof.

Another object is to provide, in a motor vehicle, a part stationary with respect to the engine thereof and frictionally restrained against movement by a part secured to the dash of said vehicle.

Another object is to provide, in a motor vehicle, a plate secured to the engine and relatively stationary with respect thereto, said plate being provided with a projecting portion received between a pair of friction surfaces secured against movement to the dash of said vehicle.

A further object is to provide, in a motor vehicle, a plate secured to the engine thereof provided with an upwardly extending portion, a member having a friction surface engaging said portion being secured against movement to the dash of said motor vehicle, and a second frictional member resiliently and adjustably secured to said member and clamping said portion against the first-mentioned member.

The above being among the objects of the present invention, the same consists in certain features of construction and combinations of parts to be hereinafter described with reference to the accompanying drawing, and then claimed, having the above and other objects in view.

Figure 1 is fragmentary perspective view of a motor vehicle engine and dash showing a preferable embodiment of the present invention associated therewith.

Figure 2 is a horizontal sectional view taken centrally through the friction member shown secured to the dash in Figure 1, as on the line 2—2 of Figure 3.

Figure 3 is a sectional view taken on the line 3—3 of Figure 2.

It is desirable in motor vehicle construction that the engine be flexibly mounted in order that the torque reaction due to the separate explosions in the engine will not be transmitted suddenly and with full force to the chassis and the torque reaction be apparent to the occupant of the vehicle as noticeable impulses or vibration. However, when such a yielding engine support is employed, at certain speeds of the engine, the number of explosions per unit of time therein corresponds to the natural period of vibration of its support, in which case the reaction in the engine due to the explosions synchronizes with the natural period of vibration of its support and a very apparent and noticeable vibration of the whole engine in the frame becomes apparent. The present invention deals with means for preventing this apparent vibration of the engine due to such synchronization from being apparent to the occupant of the vehicle of which the engine forms a part. I do this by frictionally damping such synchronized movement of the engine and this is accomplished by immovably securing to the engine an extending part, securing to the dash of the vehicle a frictional device, and frictionally engaging this extending part, whereby any movement of the engine relative to the dash is frictionally dampened.

In the accompanying drawings which show a preferable embodiment of the present invention and in which like numerals refer to like parts throughout several different views, I show in Figure 1 a fragmentary perspective view of a motor vehicle engine 10 and associated dash 11. Secured adjacent the rear edge of the cylinder head of the engine 10 by conventional cylinder head bolts 12, is a rearwardly extending plate 13 terminating in an upwardly projecting portion 14. Secured to the dash 11 by bolts 22 and nuts 23 in associated relationship with the extending portion 14 is a supporting member 15. Secured to the supporting member 15 in direct contact with the extending portion 14 is a facing member 16 of friction material. Secured across the face of the supporting member 15 is a strap member 17 having a friction facing 18 secured to the rear face thereof and contacting directly against the upwardly extending portion 14, thereby clamping the upwardly extending portion 14 between the friction faces 16 and 18.

The strap 17 is secured to the supporting member 15 by bolts 19 and nuts 20, springs 21 being interposed between the nuts 20 and the adjacent face of the strap member 17 so that the clamping action of the friction members 16 and 18 will be resiliently controlled.

It will be apparent that when the explosions of the motor synchronize with the natural period of vibration of the motor support, the excessive movement of the upper end of the engine caused thereby will be resisted by the friction between the portion 14 and the friction surfaces 16 and 18. It will be apparent, of course, that the nut 20 must not be drawn down so tightly on the bolt 19 that the portion 14 is absolutely prohibited from movement with respect to the dash 11. Otherwise the advantages of the yielding support for the motor will be lost. When the clamping action of the plate 17 is correctly controlled by the nut 20, the portion 14 will be allowed sufficient relative movement in respect to the dash 11 to realize the advantages of the yielding motor support, and at the same time will frictionally resist excessive movement of the portion 14 with respect to the dash 11 to dampen out any objectional excessive movement of the engine 10 with respect to the dash 11.

Although but one embodiment of the present invention is shown in the accompanying drawing, it will be apparent that the invention is subject to various modifications, and formal changes may be made in the specific embodiment shown without departing from the spirit and substance of the broad invention, the scope of which is commensurate with the appended claims.

What I claim is:—

1. In combination with the engine and dash of a motor vehicle, means for damping relative movement therebetween comprising, a member having a friction material attached thereto secured to the front face of said dash, a metal strip having a friction material attached thereto resiliently supported by said member in spaced relation thereto, and an L-shaped member secured to the upper face of said engine with its upwardly extending portion extending between said friction materials to be frictionally engaged thereby.

2. In combination with the engine and dash of a motor vehicle, means for damping relative movement therebetween comprising, a member having a friction facing secured to the front face of said dash, a member having a friction facing supported by said first member, means for urging said second member toward said first member, and an L-shaped member secured to said engine with one of its portions extending between said friction facings to be frictionally engaged thereby.

Signed by me at Detroit, Michigan, this 29th day of November, 1926.

VINCENT LINK.